(No Model.)

W. S. COGSWELL.
CEILING.

No. 282,167. Patented July 31, 1883.

WITNESSES
E. W. Newton
J. S. Dancey

INVENTOR
William S. Cogswell
by his atty
J. L. Newton

UNITED STATES PATENT OFFICE.

WILLIAM S. COGSWELL, OF HYDE PARK, MASSACHUSETTS.

CEILING.

SPECIFICATION forming part of Letters Patent No. 282,167, dated July 31, 1883.

Application filed October 3, 1882. (No model.)

*To all whom it may concern:*

Be it known that I, WILLIAM S. COGSWELL, a citizen of the United States, residing at Hyde Park, in the county of Norfolk and State of Massachusetts, have invented new and useful Improvements in Ceilings, of which the following is a specification.

My invention relates to improvements in confining plates of glass used for the exterior ceilings or finish of ceilings of rooms and apartments or structures of any sort. Great difficulty has been experienced hitherto so to confine plates of glass for exterior ceilings or finish as to prevent the breaking of such glass so prepared and placed in position for ceilings or ornamental finish, and also to prevent the rattling or looseness of such glass plates for this purpose; and my invention consists in fastening to the interior ceilings, directly, india-rubber supports, on which the corners of the glass plates may rest, and also providing backers of india-rubber, fastened to the interior ceilings, against which the edges of the said corners of the plates of glass may press; also, rubber wafers or circular pieces of rubber or strips of rubber fastened to the interior ceilings at suitable points, against which the backs of said plates of glass may press when the surface of the ceilings is uneven or the glass curved; and I illustrate the method of attaining the object of my invention by the following drawings, in which—

Figure 1:
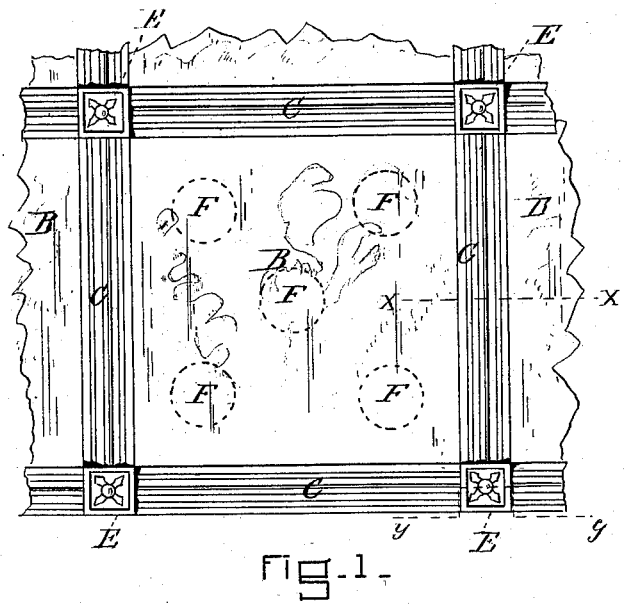
Figure 2:
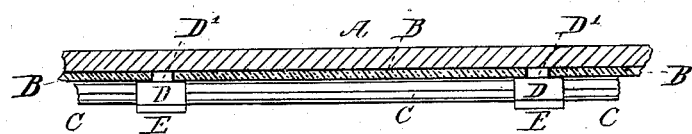
Figure 3:
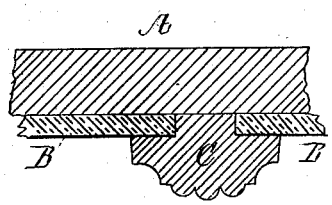
Figure 4:
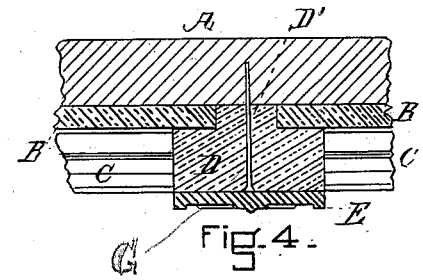
Figure 5:
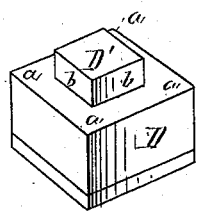
Figure 6:

Figure 1 represents a plan showing a plate of glass and the moldings as fastened to the interior ceilings. Fig. 2 is a section of the same, showing the end view of Fig. 1, with a portion of the molding removed to show the edge of the glass plate. Fig. 3 is a cross-section in line $x\ x$ of Fig. 1, showing a section of the ceiling, plates of glass, and molding. Fig. 4 is a cross-section of the ceiling, glass plates, india-rubber corner-supports of said glass plates fastened to the ceiling, and an ornamental cap for the india-rubber supports. Fig. 5 exhibits the india-rubber corner-supports. Fig. 6 shows india-rubber wafers or circular pieces of rubber fastened to the ceiling.

I also represent the ceiling by the letters A A, the plates of ornamental glass by the letters B B, the moldings by the letters C C, the india-rubber supports by the letters D D, the ornamental cap by the letters E E, the india-rubber wafers by the letters F, and the corners of the india-rubber supports by the letters $a\ a$ and $b\ b$.

By reference to the figures and letters which are made a part of this specification, one skilled in the art can readily understand the invention, which I will now more fully explain.

I make the ceilings A A in the ordinary way, whether top or horizontal ceilings, or the walls of apartments on which I design to place an exterior finish of ornamental glass, as an outer ceiling. To illustrate by Fig. 1, I mark on said ceiling the four points where the corners of the glass plate will touch, whatever be the shape of the panel or figure designed to be formed on the ceiling, and there securely fasten the four corner rubber supports D D' by nails G or other suitable fastenings. (See Fig. 4.) I then lay the plate B so its corners will rest on the rubber corner-supports D at $a$ and press against the side $b$ of the support D'. (See Figs. 4 and 5.) The back of the plate is held up against the ceiling A. Its corners are made to rest on the rubber support D at $a$, and are by said corners chiefly supported. (See Fig. 4.) The moldings C are then made to cover over the edges of the glass plates, said edges resting in the rabbets of the moldings, and are fastened to the ceilings by nails or like fastenings. (See Fig. 3.) Other plates of glass may in like manner be fastened to the ceiling, as shown in Figs. 1, 2, 3, and 4, and then an ornamental cap, E, may be placed over the rubber corner-supports D in any convenient manner.

The object of fastening rubber wafers or circular pieces of rubber, or rubber of any form suitable for the place, is to prevent breaking by the too great pressure upon the glass by the unevenness of the surface or warping of ceiling or glass.

The advantage of my method of securing ornamental glass plates to ceilings over that hitherto practiced is clearly seen. The method hitherto practiced is to nail to the ceiling strips of wood having a longitudinal projection, so as to form rabbets on both sides. In these rabbets are fitted the edges of the glass plates, where they are held by means of large glazier's points, and then over the projection of the strips is nailed a molding. In nailing the molding to the strips has been found in practice great danger of the nails striking one of these points, and thus breaking the glass plate, and the glass also being fitted in the rabbets and held by these points, and the molding is liable to be broken through warping of the wood or of the glass itself; but my rubber bearings and supports for the glass plate, both at the corners and the back next the ceiling, obviate this difficulty.

I am aware of the patent to Sewall Short, of date July 29, 1851, No. 8,259, for improvement in window-sashes. I do not claim his invention.

What I claim as my invention, and desire to secure by Letters Patent, is—

1. The combination of the interior ceiling, A, the exterior ceiling, B, and the india-rubber wafer F, substantially as shown, and for the purpose described.

2. The combination of the interior ceiling, A, the exterior ceilings, B, the elastic corner-supports D and D', and the fastening G, substantially as shown, and for the purpose described.

WILLIAM S. COGSWELL.

Witnesses:
J. L. NEWTON,
E. W. NEWTON.